United States Patent [19]
Shirakura et al.

[11] Patent Number: 5,466,519
[45] Date of Patent: Nov. 14, 1995

[54] SUPPORT FOR A PHOTOGRAPHIC PRINTING PAPER AND A MANUFACTURING PROCESS THEREFOR

[75] Inventors: Yuji Shirakura; Hisamasa Abe; Teruo Yamashita; Tatsuo Shimizu; Sei Kawahara; Takahito Miyoshi; Yasuo Nishikawa, all of Shizuoka, Japan

[73] Assignee: Fuji Photo Film Co., Ltd., Kanagawa, Japan

[21] Appl. No.: 233,975

[22] Filed: Apr. 28, 1994

[30] Foreign Application Priority Data

| Apr. 28, 1993 | [JP] | Japan | 5-128020 |
| May 17, 1993 | [JP] | Japan | 5-114928 |
| Jun. 2, 1993 | [JP] | Japan | 5-132037 |
| Aug. 30, 1993 | [JP] | Japan | 5-239094 |

[51] Int. Cl.$^6$ .................................................. B32B 5/16
[52] U.S. Cl. .......................... 428/323; 428/511; 428/513; 428/515; 430/538; 430/523
[58] Field of Search ..................... 428/511, 323, 428/515, 513; 430/538, 523, 542

[56] References Cited

U.S. PATENT DOCUMENTS

| 3,161,519 | 12/1964 | Alsup | 430/950 |
| 3,411,908 | 11/1968 | Crawford et al. | |
| 4,331,508 | 5/1982 | Miyama et al. | 162/135 |
| 4,447,524 | 5/1984 | Uno et al. | 430/538 |

Primary Examiner—Edith Buffalow
Attorney, Agent, or Firm—Sughrue, Mion, Zinn, Macpeak & Seas

[57] ABSTRACT

A support for a photographic printing paper comprising a substrate and a waterproof resin coating layers provided on the both sides of the substrate, wherein at least the waterproof resin-coating provided on the side of the substrate on which an emulsion for forming an image is coated comprises i) a lowermost waterproof resin coating layer contacting the substrate and ii) at least one upper coating layer containing a waterproof resin capable of melt-extruded at a temperature of from 170° to 290° C. and containing uniformly dispersed titanium dioxide, and a method for manufacturing the support by melt extrusion.

25 Claims, 1 Drawing Sheet

SUPPORT FOR A PHOTOGRAPHIC PRINTING PAPER AND A MANUFACTURING PROCESS THEREFOR

FIELD OF THE INVENTION

The present invention relates to a support for a photographic printing paper, particularly to a support for a photographic printing paper having an excellent resolving power, and to a manufacturing process therefor.

BACKGROUND OF THE INVENTION

Up to now, a support for a photographic printing paper comprising a substrate coated on both sides thereof with a resin has been known. In such a support, titanium dioxide, a pigment, a blueing agent (including a blue pigment), and a fluorescent whitening agent are generally contained in a coating layer on an emulsion-coated side (U.S. Pat. No. 3,501,298).

Titanium dioxide used in such a support has an action to increase a light reflection coefficient as well as a waterproofing property. It is known that the larger the content of this titanium dioxide, the higher improvement in the image resolving power is obtained.

The waterproof resin layer is formed by melt extruding a waterproof resin containing titanium dioxide from a slit die in a short time. In the case where 20 weight % or more of titanium oxide is incorporated into a resin coating and a melt extrusion is carried out at a conventional extrusion temperature, i.e., 290° to 350° C., cracking of the waterproof resin layer (hereinafter referred to as film cracking) is generated or stripes are liable to form at a die lip portion of an extruder (hereinafter referred to as die lip stripes).

Generation of such film cracking not only damages the appearance of the product but also spoils the commercial value because of loss of a water proof property. Further, formation of the die lip stripes generates continuous stripes on a surface of a film or a laminate in a longitudinal direction; therefore, not only the appearance of the product is notably damaged but also unevenness is caused on a transparency of the film during a secondary processing such as stretching, which results in reduction of the commercial value.

In addition, in order to completely remove die lip stripes once formed, there is no way other than disassembling a die lip to rinse it, and a lot of labor and time is required for assembling and rinsing it, which results in a notable reduction of productivity. Accordingly, the resolution thereof is required.

Various methods for preventing formation of die lip stripes have so far been investigated. There are proposed, for example, from a viewpoint of an improvement in a resin composition, a method in which zinc oxide and a specific amount of a metal salt of higher fatty acid are used in combination (JP-A-53-102947; the term JP-A-as used herein means an unexamined published Japanese Patent No. Application), a method in which titanium dioxide dried reducing the weight thereof and a specific amount of a metal salt of fatty acid are used in combination (JP-A-57-16819), a method in which an anti-oxidation agent and a specific amount of a metal salt of fatty acid are used in combination (JP-A-60-11841), and a method in which the conditions titanium dioxide dried reducing the weight thereof, a metal salt of fatty acid and a specific melt viscosity of the composition are selected and used in combination (JP-B-59-42296). Further, many proposals have been made, such as a method in which, from a viewpoint that since a significant amount of staining and spots generate as the amount of titanium dioxide increases, titanium dioxide is required to be modified, a surface of titanium dioxide is treated with aluminum hydroxide hydrate (JP-A-57-108849 corresponding to U.S. Pat. No. 4,447,524), a method in which a treatment with di- to tetrahydrate alcohol is carried out (JP-A-58-17433 corresponding to U.S. Pat. No. 4,442,200), a method in which a treatment with alkyltitanate is carried out (JP-A-57-151942), a method in which a treatment with organic aluminum is carried out (JP-A-62-141544), a method in which a loss of the amount on drying of titanium dioxide is controlled to 0.35% or less (JP-A-59-1544, JP-A-59-121329, and JP-A-59-215234), and a method in which the conductivity of a suspension of titanium dioxide is controlled to 60 mbo/cm or less (JP-A-58-220140).

However, they are insufficient as a method for preventing formation of the die lip stripes.

In the case where an extrusion temperature is set to less than 290° C. in order to improve such defects, the adhering power between a substrate such as a paper substrate and a waterproof resin markedly lowers.

Accordingly, a method in which the content of titanium dioxide is suppressed to 20 weight % or less even at a sacrifice of a resolving power has so far been employed.

Recently, a support for a high resolution printing paper has been developed in which an adhesion-providing resin is added to a titanium dioxide-containing layer and melt-extrusion is carried out at an extrusion temperature of 175° to 290° C. to increase the content of titanium dioxide in the layer (International Publication No. WO92/17538).

The detailed investigations on the above-described support for a high resolution printing paper made by the present inventors have clarified that not only is the dispersibility of titanium dioxide not sufficient, but separation of the titanium dioxide-containing layer from a cooling roll after extrusion-laminating is inferior, which results in a bad appearance of the product.

The extensive investigations made by the present inventors in order to more securely manufacture the support for the high resolution printing paper have resulted in finding that in the case where a waterproof resin layer containing a specific material is first provided and the above adhesion-providing resin and/or adhesive resin is not incorporated into a titanium dioxide-containing layer, titanium dioxide can readily be incorporated in an amount of 20 weight % or more and further that even in the case where extrusion molding is carried out at a melting temperature of less than 290° C., the adhesive property is sufficiently maintained, and the present invention was reached.

SUMMARY OF THE INVENTION

A first object of the present invention is to provide a support for a photographic printing paper provided on both sides of a substrate with a waterproof resin-coating layer which can be manufactured by high speed melt-extrusion coating of a waterproof resin containing titanium dioxide in a sufficient amount on the substrate without causing troubles such as the forming of film cracking or die lip stripes.

A second object of the present invention is to provide a support for photographic printing paper having a high resolving power and having an excellent adhesive power of a waterproof resin layer to a substrate.

A third object of the present invention is to provide a manufacturing process for the support as described above, without forming any film cracking or die lip stripes.

The above objects of the present invention have been achieved by a support for a photographic printing paper comprising a substrate and a waterproof resin coating layers provided on the both sides of the substrate, wherein at least the waterproof resin-coating provided on the side of the substrate on which an emulsion for forming an image is coated comprises i) a lowermost waterproof resin coating layer contacting the substrate and ii) at least one upper coating layer containing a waterproof resin capable of melt-extruded at a temperature of from 170° to 290° C. and containing uniformly dispersed titanium dioxide, and a method for manufacturing the support, which comprises coating the waterproof resin layer containing titanium dioxide by melt-extrusion at 170° to 290° C.

DETAILED DESCRIPTION OF THE INVENTION

Figure 1:
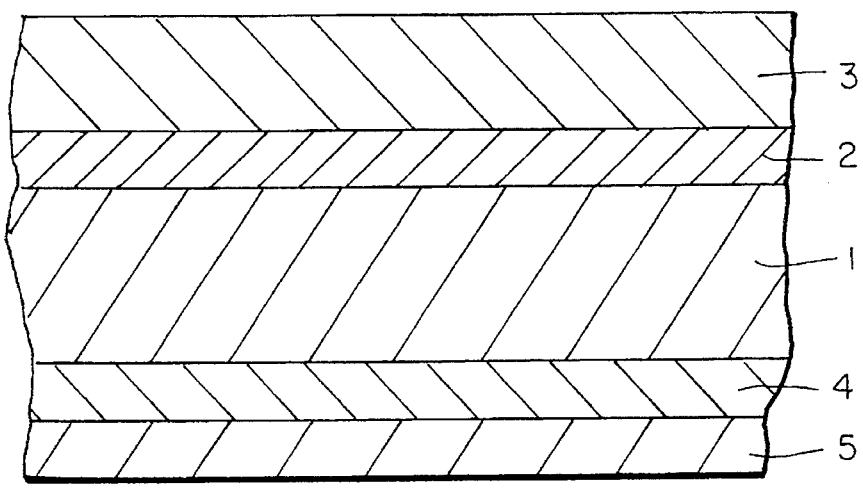
FIG. 1 shows a partial sectional schematic diagram of an embodiment of the support for a photographic printing paper of the present invention.

The support for a photographic printing paper of the present invention and the manufacturing process therefor will be explained below in detail.

A waterproof resin for forming a coating layer in the present invention is preferably selected from the resins which can be melt-extruded at about 170° to 290° C. Usually, a polyolefin resin such as a polyethylene, a polypropylene or a polyester copolymer is used, and a polyethylene is particularly preferably used. The polyethylene may be any one of a high density polyethylene, a low density polyethylene and a linear low density polyethylene, which may be used singly or in a mixture of two or more kinds.

In the present invention, the melt index of the waterproof resin in the upper layer is preferably higher than the melt index of the waterproof resin in the lowermost layer.

The melt index (MI) of a waterproof resin is measured according to condition shown in Table 1 of JISK 7210. In the present invention, the melt index of the resin before processing is the melt index of a resin before kneading with additives such as a blueing agent and $TiO_2$, or is the melt index of a diluting resin before using as a diluent.

In the present invention, the melt index of the waterproof resin containing titanium dioxide is preferably falls in a range of 1.2 to 100 g/10 minutes, and the waterproof resin used in the other waterproof resin coating layer(s) preferably also has a melt index falling in a range of 1.2 to 100 g/10 minutes. The melt index is more preferably within the range of from 2 to 80 g/10 minutes and particularly preferably from 10 to 50 g/10 minutes. Furthermore, it is preferred that the melt index of the upper waterproof layer(s) containing titanium dioxide has a higher melt index than the lowest waterproof resin layer in order to harmonize the flow properties of these layers to obtain even layers.

When a resin having MI lower than 1.2 g/10 minutes is used, extrusion lamination tends to be difficult, that is, a thin layer lamination tends to be difficult because of a high viscosity, on the other hand, when a resin having MI higher than 100 g/10 minutes is used, the extruded layer tends to be unstable or a layer is hardly formed because of a low viscosity.

A form of titanium dioxide used in the present invention may be either an anatase type or a rutile type. In the case of taking precedence of whiteness, the anatase type is preferably used, and in the case of taking precedence of sharpness, the rutile type is preferably used. Further, titaniumdioxide of the anatase type and the rutile type may be blended and used taking both of whiteness and sharpness into consideration, or in the case of composing a titanium dioxide-containing layer of two layers, titanium dioxide of the anatase type may be added to one of the layers and titanium dioxide of the rutile type may be added to the other layer.

The average particle size of titanium dioxide falls preferably in a range of from 0.1 to 0.4 μm. When the average particle size is less than 0.1 μm it is difficult to uniformly mix and disperse the particles into a resin layer. On the other hand, when the average particle size exceeds 0.4 μm, sufficient whiteness cannot be obtained and in some cases projections generate on a coated surface to exert an adverse influence on image quality.

Examples of titanium dioxide having such a form and an average particle size are titanium dioxide having a brand name KA-10 or KA-20 manufactured by Titan Ind. Co., Ltd., and a brand name A-220, PF-656, PF-654, PF-671, PF-715, or CR-63 manufactured by Ishihara Industry Co., Ltd.

In general, in order to restrain the activity of titanium dioxide and to prevent yellowing, titanium dioxide is subjected to a surface treatment with an inorganic material such as aluminum oxide hydrate and silicon oxide hydrate. Also titanium dioxide can be subjected to a surface treatment with an organic material such as polyhydric alcohol, polyvalent amine, metallic soap, alkyltitanate, and polysiloxane, and it can be subjected to a surface treatment with the processing agents of an inorganic material and an organic material in combination.

These processing agents can be used in a proportion of 0.2 to 2.0 weight % based on titanium dioxide in the case of the inorganic material and in a proportion of 0.1 to 1.0 weight % based on titanium dioxide in the case of the organic material.

Titanium dioxide is kneaded in a waterproof resin with a kneading machine having two rolls or three rolls, a kneader, or a Bumbury's mixer using a metal salt of higher fatty acid, higher fatty ester, higher fatty amide, and higher fatty acid as a dispersing aid. The titanium dioxide-containing waterproof resin thus obtained is molded in a pellet form and used as a master batch of titanium dioxide.

The titanium dioxide concentration in a pellets is preferably from about 30 to 75 weight % and a concentration of the dispersing aid is preferably from about 0.5 to 10 weight % based on the amount of titanium dioxide.

The amount of titanium dioxide in the at least one waterproof resin layer is generally from 5 to 60 weight %, preferably from 8 to 55 weight %, and more preferably from 20 to 50 weight % based on the amount of the composition of the waterproof resin layer.

Titanium dioxide may be incorporated into two or more of upper layers each generally in an amount of 5 to 60 weight %.

When the support has two waterproof resin layers on the lowermost waterproof resin layer, the amount of titanium dioxide in the uppermost layer is preferably 0 to 50 weight % and in the middle waterproof layer is preferably 0 to 60 weight %. The amount of titanium dioxide in the lowermost layer is generally 0, but it may be incorporated in an amount of less than 20 weight %, preferably not more than 15 weight %, and more preferably not more than 10 weight %. When the total amount of the titanium dioxide in the support is less than 5 weight %, a photographic material having a lower resolving power is obtained, and when the amount in one layer exceeds 60 weight %, the layer is liable to generate cracking when it is bent. (In the present invention the amount of each of titanium dioxide and other additives in a waterproof resin layer are indicated based on the total weight of the components contained in the composition of the waterproof resin layer.)

In order to further improve adhesion of the lowermost layer to the substrate, the layer may contain at least one additive selected from a tackifier (an adhesion-providing resin), an adhesive resin, talc, kaolin and calcium carbonate.

A tackifier is a resin which is usually an oligomer and which is used to provide tackiness to other resins, e.g., an elastomer thereby to obtain an elastomer having a higher adhesiveness. A tackifier cannot be laminated. It is usually used as an additive.

Examples of the tackifier used in the present invention include a rosin compound resin (e.g., methyl ester, glycerine ester and pentaerythritol ester of a rosin such tall oil rosin), a terpene resin (for example, poly-β-pinene), a coumarone-indene resin and a petroleum series hydrocarbon resin. Two or more of these resins may be used in combination. Specific examples of the petroleum series hydrocarbon resin include an aliphatic series petroleum resin, an aromatic series petroleum resin, a cyclopentadiene series petroleum resin, a copolymer series petroleum resin, a hydrogenation series petroleum resin, and an alicyclic series petroleum resin. The aliphatic series petroleum resin having 5 carbon atoms is particularly preferable, and the aromatic series petroleum resin having 9 carbon atoms is particularly preferable.

The tackifier is incorporated into the waterproof resin preferably in an amount of from 0.5 to 60 weight %, more preferably 10 to 35 weight % based on the waterproof resin composition of the waterproof resin layer. When incorporated amount of the tackifier is less than 0.5 weight % improvement in adhesion is insufficient, and when the amount exceeds 60 weight % the layer is liable to generate a neck-in during manufacturing.

The adhesive resin used in the present invention is a resin which is able to be laminated solely and heat-adhesive with a waterproof resin, for example, an ionomer (e.g., an ethylene-metharylic acid copolymer cross linked by metal ions such as Na ions or Zn ions), an adhesive polyolefin resin, an ethylene copolymer resin such as an ethylene-vinyl acetate copolymer (EVA), an ethylene-methyl methacrylate copolymer (EMMA), an ethylene-ethyl acrylate copolymer (EEA), an ethylene-methyl acrylate copolymer (EMA), an ethylene-acrylic acid copolymer (EAA), an ethylene-ethyl acrylate-maleic anhydride copolymer (E-EA-MAH), an ethylene-methacrylic acid copolymer (EMAA), and those obtained by graft-polymerizing a polyolefin (e.g., polypropylene and polyethylene) with maleic anhydride (MAH-g-polyolefin), and the metal salts thereof (such as salts of Na, Zn or Mg). An incorporated amount of this adhesive resin is preferably in a range of from 5 to 500 weight %, more preferably from 10 to 200 weight %, even more preferably from 20 to 100 weight % based on the weight of the composition in the lowermost waterproof resin layer.

In the case where the tackifier and the adhesive resin are used in combination, the tackifier is converted to the adhesive resin of an amount of five times the addition amount of the tackifier.

Talc, kaolin, and calcium carbonate used in the present invention have preferably an average particle size of from 0.01 μm to 1.0 μm, more preferably from 0.1 μm to 0.5 μm. An average particle size less than 0.01 μm makes dispersion difficult and an average particle size exceeding 1.0 μm tends to deteriorate the face condition of a covering surface. The addition amount of at least one of talc, kaolin and calcium carbonate is preferably from 0.1 wt % to 30 wt %, more preferably from 1.0 wt % to 20 wt % based on the total weight of the layer composition containing at least one of these compounds. When the amount is less than 0.1 wt %, sufficient improvement in adhesion of the layer to the support cannot be attained, and when the amount exceeds 30 wt %, whiteness of the layer tends to lower. Although any one of talc, kaolin, calcium carbonate particles and a mixture thereof may be used, talc is preferably used. Talc, kaolin, and/or calcium carbonate used in the present invention provides an effect for improving the adhesion of the waterproof layer to a substrate such as a base paper layer remarkably as compared with other inorganic particles, for example, $BaSO_4$, $ZnO$, $TiO_2$, $ZnS$, $MgCO_3$, and carbon.

A blueing agent can be incorporated into a waterproof resin layer provided on the emulsion side of the support. Conventionally known blueing agents such as ultramarine, cobalt blue, phosphoric oxide cobalt, a quinacridone series pigment, and a mixture thereof can be used.

The particle size of the blueing agent is not specifically limited and usually falls preferably in a range of from 0.3 to 10

The blueing agent is incorporated preferably in a range of from 0.2 to 0.4 weight % (based on the amount of the composition of the resin layer) in case of using it for the uppermost layer and in a range of from 0 to 0.15 weight % in case of using it for a layer other than the uppermost layer.

The blueing agent is kneaded in a waterproof resin with a kneading machine having two rolls or three rolls, a kneader, or a Bumbury's mixer. The blueing agent-containing waterproof resin thus obtained is molded into a pellet form and used as a master batch of the blueing agent.

A concentration of the blueing agent contained in pellets is preferably from about 1 to 30 weight %. In forming the pellets of the blueing agent, the blueing agent and titanium dioxide can be kneaded together. Further, in order to help dispersion of the blueing agent, there can be used a dispersing aid such as a waterproof resin of a low molecular weight (such as a low molecular weight polyolefin), a metal salt of a higher fatty acid (such as zinc stearate), a higher fatty ester, a higher fatty amide, and a higher fatty acid. An preferred amount of the dispersing aid is 0.1 to 1 parts by weight per 1 parts by weight of the bluing agent.

An anti-oxidation agent can be incorporated as well into the waterproof resin layer according to the present invention. The content thereof is preferably from about than 50 to 1,000 ppm based on the waterproof resin amount. Examples of the anti-oxidation agent include 2,6-di-t-butyl-p-cresol and tetrakis[methylene-3-(3,5-di-t-butyl-4-hydroxyphenyl-)propionate]methane.

The master batch thus prepared containing titanium dioxide and/or the blueing agent is suitably diluted with the waterproof resin and used for coating.

The multi-layer waterproof resin layer in the present invention is formed on a substrate such as a paper or a synthetic paper by mixing the pellets containing titanium dioxide and/or the blueing agent, diluting with a waterproof resin if desired, heat-melting, and using a successive laminate method or a laminate method using a multi-layer extruding die of a feet block type, a multi-manifold type or a multi-slot type.

The form of the die for a multi-layer extrusion is not specifically limited. In general, a T die or a coat hanger die are preferably used.

In the manufacturing process of the present invention, the waterproof resin of the lowermost layer is coated on the surface of the emulsion-coating side of the substrate by a melt-extruding method, and then or simultaneously at least one upper layer including a waterproof resin layer containing titanium dioxide is coated by melt-extruding method on this layer.

The melt-extrusion temperature of the upper layer(s) containing titanium dioxide is preferably from 170° to 290° C., more preferably from 240 to 270° C. The upper layer containing no titanium oxide is preferably extruded at a temperature of from 170° to 345° C., more preferably 270° to 335° C.

When the melt-extruding temperature of the layer containing titanium oxide is lower than 170° C., oxidation of the waterproof resin insufficient which results in lowering of adhesion between the waterproof resin layers. On the other hand, when the layer contains more than 20 weight % of titanium oxide and the extrusion temperature exceeds 290° C. a film cracking and die lip stripes occur, which markedly damage the appearance of the product.

The lowermost layer is preferably extruded at a temperature of from 230° to 345° C., more preferably 270° to 340° C., and particularly preferably 290° to 335° C.

Before coating a resin on a substrate, the substrate is preferably subjected to an activation treatment such as a corona discharge treatment, a flame treatment, a glow discharge treatment or a plasma treatment.

In the case where the multi-layer waterproof resin layer of the present invention is composed of, for example, two layers, it is preferred that the upper layer has a layer thickness of from 0.5 to 50 μm, more preferably from 2 to 40 μm, and most preferably from 10 to 30 μm, and the lowermost layer has a layer thickness of from 0.5 to 20 μm, preferably from 5 to 15 μm, and in the case of three layers, it is preferred that the uppermost layer has a layer thickness of from 0.5 to 50 μm, the intermediate layer has a layer thickness of from 5 to 50 μm and the lowest layer has a layer thickness of from 0.5 to 10 μm. In the latter case it is preferred that titanium dioxide is incorporated into the intermediate layer and is not incorporated into the uppermost layer in order to prevent the formation of stripes more efficiently.

It is preferred that the total thickness of the waterproof layers on the substrate (emulsion coated side) is from 10 to 60 μm.

According to the present invention, a die lip stripes and film cracking generated during coating a waterproof resin containing $TiO_2$ in a high concentration by melt-extrusion can be prevented and coating by high speed melt-extrusion is enabled.

In the present invention, a detailed mechanism of pre-venting film cracking is not clear. The film cracking is considered a phenomenon that during melt-extruding a waterproof resin containing $TiO_2$ in a high concentration at a usual melt-extruding temperature of 290° C. to 340° C, water and a volatile component contained in $TiO_2$ and a surface treating agent for $TiO_2$ are converted to gas when they are discharged from an extruder or a die lip, and therefore a molten film of the waterproof resin discharged from the die lip is cracked by the gas. $TiO_2$ containing more water and/or volatile matter generates more film cracking at a low $TiO_2$ concentration region.

A $TiO_2$ concentration increased to 20 wt % or more suddenly increases die lip stripes. It is considered that this is because the presence of $TiO_2$ makes a waterproof resin susceptible to oxidation.

In the present invention, the extrusion temperature for coating a waterproof resin containing $TiO_2$ in a high concentration is preferably from 170° C. to 290° C. By conducting extrusion at such a low temperature conversion of water and a volatile component contained in $TiO_2$ and a surface treating agent for $TiO_2$ to gas is restrained and extruding of a waterproof resin film free of film cracking is enabled to obtain a layer containing uniformly dispersed $TiO_2$ in a high concentration. Further, reduction of the melt-extruding temperature can decrease oxidation of the waterproof resin at the same time and can prevent die lip stripes.

In the present invention, by adjusting the melt index of a waterproof resin used in the waterproof resin layer containing $TiO_2$ to 1.2 g/10 minutes to 100 g/10 minutes, melt-extrusion at a low temperature at a high speed can be more efficiently conducted. An excellent adhesion of the lowermost waterproof resin layer to a substrate such as paper or a synthetic paper can be secured by adjusting a melt-extruding temperature of the lowest layer to a usual temperature of 290° C. to 345° C., or by using an additive for improving the adhesion of the lowermost waterproof resin layer. Thus, a high speed melt-extrusion coating for production of a support for photographic printing paper having a high sharpness can be obtained.

A glossy face, a fine face, a matting face, or a silk face described in JP-A-55-26507 is generally provided on the outermost surface of the waterproof resin layer on the emulsion-coated side, and a non-gloss layer is provided on a back face of the support.

The surface obtained after providing the marking can be subjected to an activation treatment such as a corona discharge treatment or a flame treatment and can be subjected as well to a treatment for forming a subbing layer described in JP-A-61-846443 after the activation treatment.

The substrate used in the present invention may be any one of a natural pulp paper containing a natural pulp as a primary component, a mixed paper comprising a natural pulp and a synthetic fiber, a synthetic fiber paper containing a synthetic fiber as a primary component, and that obtained by converting a synthetic resin such as polystyrene or polypropylene to a paper-like material, a so-called synthetic paper. The natural pulp paper (hereinafter called simply the base paper) is particularly preferably used as a substrate for a photographic printing paper.

Examples of additives which can be incorporated into the base paper include a filler such as clay, talc, calcium carbonate, and a urea resin fine particle, a sizing agent such as rosin, a higher fatty acid salt, paraffin wax, and alkenyl-succinic acid, a paper strengthening agent such as polyacrylamide, and a fixing agent such as aluminum sulfate as well as alkylketene dimer. In addition thereto, a dye, a fluorescent dye, a slime controller, and a defoaming agent are added, if desired.

Further, the following softening agents can be added, if desired.

The softening agent is described in, for example, "New Paper Processing Manual" (edited by Shiyaku Time Co., Ltd.), pp. 554 to 555 (published in 1980) can be added. A softening agent having a molecular weight of 200 or more is particularly preferred. This softening agent has a hydrophobic group having 10 or more carbon atoms and is in a form of an amine salt or quaternary ammonium salt self-fixing to cellulose.

Examples of specific softening agents include a reaction product of a maleic anhydride copolymer and a polyalkylenepolyamine, a reaction product of a higher fatty acid and a polyalkylenepolyamine, a reaction product of a urethane alcohol and an alkylation agent, and a quaternary ammonium salt of a higher fatty acid. Particularly preferred are the reaction product of a maleic anhydride copolymer and a polyalkylenepolyamine and the reaction product of a urethane alcohol and an alkylation agent.

A surface sizing treatment can be provided on a pulp surface with a film-forming polymer (hydrophilic polymer) such as gelatin, starch, carboxymethyl cellulose, polyacrylamide, and a modified substance of polyvinyl alcohol. In this case, a carboxyl group-modified substance, a silanol-modified substance, and a copolymer with acrylamide can be used as the polyvinyl alcohol-modified substance. The coated amount of the film-forming polymer is preferably controlled to 0.1 to 5.0 $g/m^2$, more preferably 0.5 to 2.0 $g/m^2$.

Further, an anti-static agent, a fluorescent whitening agent, a pigment, and a defoaming agent can be added to the above film-forming polymer, if desired.

The base paper is manufactured by subjecting a pulp slurry containing pulp and additives such as a filler, a sizing agent, a paper strengthening agent, and a fixing agent which are added, if desired, to paper making with a paper making machine such as a Fort-linear paper machine, drying and rolling up. The surface sizing treatment described above is carried out either before or after drying, and a calendering treatment is carried out during the period of after drying to rolling up.

The above calendering treatment can be carried out at either before or after the surface sizing treatment in the case where the surface sizing treatment is carried out after drying. The calendering treatment is carried out preferably in a final finishing process after carrying out various treatments. Conventional metal rolls and the elastic rolls usually used for manufacturing paper may be used for the calendering treatment.

The base paper used for the support for the photographic printing paper of the present invention is finally controlled to a thickness preferably of from 50 to 250 m by the calendering treatment described above. The base paper generally has a density of from 0.8 to 1.3 $g/m^3$, preferably from 1.0 to 1.2 $g/m^3$.

Various back coating layers can be provided on the support for the photographic printing paper in the present invention for anti-electrification and anti-curling. Further, there can be suitably combined and incorporated into the back coating layer, inorganic anti-static agents, organic anti-static agents, hydrophilic binders, latexes, hardeners, pigments, and surface active agents described, for example, in JP-B-52-18020 (U.S. Pat. No. 3,884,692; the term "JP-B" as used herein means an examined Japanese patent publication), JP-B-57-9059 (U.S. Pat. No. 4,173,480), JP-B-57-53940 (U.S. Pat. No. 4,196,001), JP-B-58-56859, JP-A-59-21484 and JP-A-58-184144 (U.S. Pat. No. 4,547,445).

The photographic support of the present invention can be provided with various photographic constitutional layers and used for various applications such as a color photographic printing paper, a black and white photographic printing paper, a photocomposition printing paper, a paper for phototype setting, a reversal photographic material, a negative or positive material used in a silver salt diffusion transfer process, and a printing material. For forming an image on the support of the present invention at least one emulsion layer is provided on the support. Examples of the emulsion include light-sensitive silver halide emulsion, and examples of silver halide include silver chloride, silver bromide, silver chlorobromide, silver iodobromide, and silver chloroiodobromide. The color couplers can be incorporated into the silver halide photographic emulsion layers to provide a multi-layer silver halide color photographic constitutional layer. A physical developing nucleus can be incorporated to provide a silver salt diffusion transfer image-receiving layer.

The support for a photographic printing paper of the present invention has no die lip stripes and film cracking while maintaining an excellent adhesion of a substrate to a waterproof resin-coating layer, and enables high speed melt-extrusion coating. The support is able to provide a high sharpness when used as a photographic printing paper.

The present invention will be explained below in further detail with reference to the examples, but the present invention will not be limited thereto. Unless otherwise indicated, all parts, percents, ratios and the like are by weight.

Example 1

At a first laminate station, polyethylene having a density of 0.945 $g/m^3$ and MI of 8 g/10 minutes was coated on one side of a base paper having a weight of 170° $g/m^2$ at a speed of 200 m/minute to form a polyethylene layer having a film thickness of 28 μm.

Subsequently, at a second station, polyethylene having a density of 0.945 $g/cm^3$ and MI of 20 g/10 minutes and containing 40 wt % of $TiO_2$ and 1.5 wt % of zinc stearate as a dispersant for $TiO_2$ as an upper layer in a film thickness of 15 μm at an extruding temperature of 250° C. and polyethylene having a density of 0.945 $g/m^3$ and MI of 2 g/10 minutes as a lower layer in a film thickness of 15 μm at an extruding temperature of 320° C. were laminated on the other side of the base paper. The total thickness of the upper and lower layers was 30 μm, and the layers were laminated by a multi-layer extrusion at a speed of 200 m/minute. Thus, a support for a photographic printing paper having no film cracking generated and having an adhesion to the base paper of 300 g/15 mm width (a peel strength measured at a speed of 50 mm/minute and 180° C. with a load cell of 50 kg using a tensilon (manufactured by Toyo Seiki Co., Ltd.) was obtained. This support had a peel strength of the same level as that obtained by a conventional single layer-extrusion laminate method at 320° C. Die lip stripe formation was not observed even after an operation for 8 hours.

Comparative Example 1

At the second station in Example 1, polyethylene having a density of 0.945 $g/m^2$ and MI of 2 g/10 minutes and containing 40 wt of $TiO_2$ and 1.5 wt % of zinc stearate as a dispersant for $TiO_2$ and in a film thickness of 30 μm at an extruding temperature of 320° C. was laminated in a single layer. Film cracking and die lip stripes were generated on the thus obtained support, and an even polyethylene coating layer could not be formed.

Comparative Example 2

At the second station in Example 1, a composition the same as that of the upper polyethylene layer in Example 1 was used to form a single layer laminate at a speed of 200 m/minute on the other side of the base paper in a film thickness of 30 µm. The laminate processing could not be continued due to film peeling between the base paper and the polyethylene layer.

Comparative Example 3

At the second station in Example 1, a polyethylene having a MI of 2 g/10 minutes was laminated instead as polyethylene of the upper layer in Example 1 to a film thickness of 15 µm at a extruding temperature of 320° C., with the lower layer being the same as that in Example 1 with the same conditions. The total thickness of the upper and lower layers was 30 µm, and the layers were laminated by a multi-layer extrusion at a speed of 200 m/minute. Film cracking was generated on the upper layer of the thus obtained support and an even polyethylene coating layer could not be formed.

Example 2

In the same manner as Example 1, at the first laminate station, polyethylene having a density of 0.945 g/m$^3$ and MI of 8 g/10 minutes was coated on a base paper having a weight of 170° g/m$^2$ to a film thickness of 28 µm at a speed of 200 m/minute to form a polyethylene layer on one side of the base paper.

Subsequently, at the second station, polyethylene having a density of 0.945 g/m$^3$ and MI of 20 g/10 minutes was used for an upper layer, and polyethylene having a density of 0.945 g/m$^3$ and MI of 2 g/10 minutes was used for the lower layer. TiO$_2$ was added into the polyethylene in a proportion shown in the following Table 1 and zinc stearate was incorporated in a proportion of 5.0 wt % based on the TiO$_2$ amount, followed by kneading it a Bumbury's mixer and molding to a pellet form, whereby a master batch was prepared. TiO$_2$ having an average particle size of 0.15 µm to 0.35 µm as observed with an electron microscope, and having a coating of aluminum oxide hydrate in an amount of 0.35 wt % based on TiO$_2$ in terms of Al$_2$O$_3$ was used.

On the other side of the base paper coated at the first station, the upper layer was formed at an extruding temperature of 250° C. and the lower layer was formed at an extruding temperature of 320° C. in a film thickness as shown in Table 1. A two-layer polyethylene coating was obtained at a speed of 200 m/minute.

Next, this polyethylene layer surface was subjected to a glow discharge treatment, and then a silver chloride emulsion was coated to thereby obtain a photographic printing paper. The photographic printing paper was tightly contacted on a resolving power chart and exposed to a green light, followed by subjecting it to a color image processing, whereby a test sheet was obtained. This test sheet was measured with a microdensitometer and a calculation was carried out with a personal computer according to a conventional method to obtain the CTF (Contrast Transfer Function: a value at 10 lines/mm) as a sharpness of an image in a magenta layer to judge the sharpness of a printed image on a photographic resin-coated paper. In regard to the CTF, the larger the value thereof, the higher the sharpness of a printed image.

The results are shown in Table 1. As is apparent from Table 1, it can be found that the support for a photographic printing paper of the present invention is able to provide a high sharpness of a printed image.

TABLE 1

| Sample No. | TiO$_2$ concentration (wt %)/ layer thickness (µm) | | Sharpness of printed image |
|---|---|---|---|
| | Upper layer | Lower layer | CTF value |
| 1 | 15/15 | 15/15 | 0.62 |
| 2 | 50/15 | 0/15 | 0.82 |
| 3 | 40/15 | 0/15 | 0.80 |
| 4 | 40/15 | 15/15 | 0.81 |
| 5 | 30/15 | 0/15 | 0.77 |
| 6 | 25/15 | 0/15 | 0.73 |

Example 3

A support having a layer structure shown in FIG. 1 was prepared in the following manner.

A polyethylene resin layer having the composition shown in the following Table 2 was laminated by multi-layer extrusion on the back side of the paper substrate 1 treated with a corona discharge of an output of 1 KW and having a width of 50 cm and an average weight of 170° g/m$^2$, at 325° C. and at a line speed of 200 m/minute to thereby provide waterproof resin layers 4 and 5 each having a thickness of 14 µm.

TABLE 2

| Layer No. | Polyethylene composition | Density (g/cm$^3$) | Mixing ratio (weight ratio) | MI (g/10 min.) |
|---|---|---|---|---|
| 4 | High density | 0.969 | 7 | 9 |
| | Low density | 0.918 | 3 | 5 |
| 5 | High density | 0.969 | 5 | 9 |
| | Low density | 0.918 | 5 | 5 |

Next, the waterproof resin layer 2 and the titanium dioxide-containing waterproof resin layer 3 were provided on the front side of the paper substrate 1, which was the emulsion-coated side. The layer composition and coating conditions are shown in the following Table 3. Thus, a support for a photographic printing paper was prepared.

TABLE 3

| Layer No. | Composition | Added amount (weight %) | Thickness (µm) | Laminate temperature (°C.) |
|---|---|---|---|---|
| 3 | Low density polyethylene (density: 0.918 g/cm$^3$, MI: 20 g/10 min.) | 57.9 | | |
| | Titanium dioxide (anatase type, surface coating: 0.4% Al$_2$O$_3$ treatment) | 40.0 | 20 | 260 |
| | Ultramarine | 0.5 | | |
| | Zinc stearate | 1.6 | | |
| 2 | Low density polyethylene (density: 0.918 g/cm$^3$, MI: 20 g/10 min.) | 95 | 10 | 260 |
| | High molecular weight | 5 | | |

TABLE 3-continued

| Layer No. | Composition | Added amount (weight %) | Thickness (μm) | Laminate temperature (°C.) |
|---|---|---|---|---|
| | β-pinene (terpene series resin) | | | |

Example 4

A support having a layer structure shown in FIG. 1 was prepared in the following manner. The waterproof resin layers 4 and 5 of a polyethylene resin were provided on the back side of the paper substrate 1 in the same manner as in Example 3, and then the waterproof resin layer 2 and the titanium dioxide-containing waterproof resin layer 3 were provided on the front side of the paper substrate 1, which was the emulsion-coated side. The layer composition and coating conditions are shown in the following Table 4. Thus, a support for a photographic printing paper was prepared.

TABLE 4

| Layer No. | Composition | Added amount (weight %) | Thickness (μm) | Laminate temperature (°C.) |
|---|---|---|---|---|
| 3 | Low density polyethylene (density: 0.918 g/cm³, MI: 20 g/10 min.) | 57.5 | | |
| | Titanium dioxide (anatase type, surface coating: 0.4% Al₂O₃ treatment) | 40.0 | 25 | 260 |
| | Ultramarine | 0.5 | | |
| | Zinc stearate | 2.0 | | |
| 2 | Low density polyethylene (density: 0.918 g/cm³, MI: 20 g/10 min.) | 50 | 5 | 260 |
| | EVA (ethylene-vinyl acetate copolymer) | 50 | | |

Example 5

A support having a layer structure shown in FIG. 1 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layer 3 were provided on the front side of the paper substrate 1, which was the emulsion-coated side. The composition and coating conditions are shown in the following Table 5. Thus, a support for a photographic printing paper was prepared.

Example 6

A support having a layer structure shown in FIG. 1 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layer 3 were provided on the front side of the paper substrate 1, which was the emulsion-coated side. The composition and coating conditions shown are in the following Table 6. Thus, a support for a photographic printing paper was prepared.

TABLE 5

| Layer No. | Composition | Added amount (weight %) | Thickness (μm) | Laminate temperature (°C.) |
|---|---|---|---|---|
| 3 | Low density polyethylene (density: 0.918 g/cm³, MI: 50 g/10 min.) | 68.3 | | |
| | Titanium dioxide (anatase type, surface coating: 0.4% Al₂O₃ treatment and 0.5% TME[1] treatment) | 30.0 | 25 | 240 |
| | Ultramarine | 0.5 | | |
| | Zinc stearate | 1.2 | | |
| 2 | Low density polyethylene (density: 0.918 g/cm³, MI: 50 g/10 min.) | 70 | 5 | 240 |
| | Alcon P-140 (trade name for alicyclic saturated hydrocarbon resin manufactured by Arakawa Chemical Ind. Co., Ltd.) | 30 | | |

[1]TME: trimethylolethane

TABLE 6

| Layer No. | Composition | Added amount (weight %) | Thickness (μm) | Laminate temperature (°C.) |
|---|---|---|---|---|
| 3 | Low density polyethylene (density: 0.920 g/cm³, MI: 10 g/10 min.) | 74 | | |
| | Titanium dioxide (rutile type, surface coating: 0.7% Al₂O₃ treatment and 0.5% SiO₂ treatment) | 25 | 20 | 280 |
| | Zinc stearate | 1.0 | | |
| 2 | Low density polyethylene (density: 0.920 g/cm³, MI: 10 g/10 min.) | 79.5 | 10 | 280 |
| | Hiletz T-1115 (trade name for alicyclic saturated hydrocarbon resin manufactured by Mitsui Petrochemical Ind. Co.) | 20 | | |
| | Ultramarine | 0.5 | | |

Example 7

Figure 2:
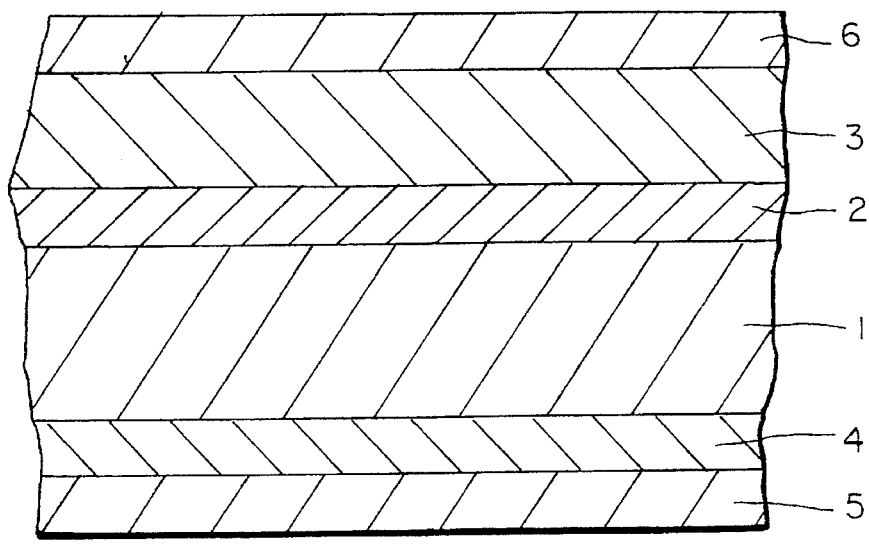
FIG. 2 shows a partial sectional schematic diagram of another embodiment of the support for a photographic printing paper of the present invention in case of using three waterproof resin layers on an emulsion coating side of a substrate.

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 6 and the titanium dioxide-containing waterproof resin layer 3 were provided on the front side of the paper substrate 1, which was the emulsion-coated side. The composition and coating conditions are shown in the following Table 7. Thus, a support for a photographic printing paper was prepared.

TABLE 7

| Layer No. | Composition | Added amount (weight %) | Thickness (μm) | Laminate temperature (°C.) |
|---|---|---|---|---|
| 6 | Low density polyethylene (density: 0.918 g/cm³, MI: 4 g/10 min.) | 30 | 2 | 275 |
|   | High density polyethylene (density: 0.965 g/cm³, MI: 10 g/10 min.) | 70 | | |
| 3 | Low density polyethylene (density: 0.918 g/cm³, MI: 20 g/10 min.) | 69 | | |
|   | Titanium dioxide (rutile type, surface coating: 0.7% $Al_2O_3$ treatment and 0.5% $SiO_2$ treatment) | 30 | 20 | 260 |
|   | Zinc stearate | 1 | | |
| 2 | Low density polyethylene (density: 0.918 g/cm³, MI: 7 g/10 min.) | 89.5 | 8 | 285 |
|   | FTR 8120 (trade name for aromatic petroleum resin manufactured by Mitsui Petrochemical Ind. Co.) | 10 | | |
|   | Ultramarine | 0.5 | | |

Example 8

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in the following Table 8. Thus, a support for a photographic printing paper was prepared.

TABLE 8

| Layer No. | Composition | Added amount (weight %) | Thickness (μm) | Laminate temperature (°C.) |
|---|---|---|---|---|
| 6 | Low density polyethylene (density: 0.918 g/cm³, MI: 4 g/10 min.) | 25 | 3 | 285 |
|   | High density polyethylene (density: 0.965 g/cm³, MI: 10 g/10 min.) | 65 | | |
|   | Titanium dioxide (anatase type, surface coating: 1.7% $Al_2O_3$ treatment) | 9.5 | | |
|   | Zinc stearate | 0.5 | | |
| 3 | Low density polyethylene (density: 0.918 g/cm³, MI: 80 g/10 min.) | 73.5 | | |
|   | Titanium dioxide (rutile type, surface coating: 0.7% $Al_2O_3$ treatment and 0.5% silicon treatment) | 25 | 20 | 190 |
|   | Zinc stearate | 1.3 | | |
|   | Ultramarine | 0.2 | | |
| 2 | Low density polyethylene (density: 0.918 g/cm³, MI: 10 g/10 min.) | 79.6 | 7 | 280 |
|   | Ultramarine | 0.4 | | |
|   | Petrozine #120 (trade name for an aromatic petroleum resin manufactured by Mitsui Petrochemical Ind. Co.) | 20 | | |

Example 9

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in the following Table 9. Thus, a support for a photographic printing paper was prepared.

TABLE 9

| Layer No. | Composition | Added amount (weight %) | Thickness (μm) | Laminate temperature (°C.) |
|---|---|---|---|---|
| 6 | Low density polyethylene (density: 0.918 g/cm³, MI: 4 g/10 min.) | 33.6 | 3 | 270 |
|   | High density polyethylene (density: 0.965 g/cm³, MI: 10 g/10 min.) | 45 | | |
|   | Ultramarine | 0.7 | | |
|   | Titanium dioxide (anatase type, surface coating: 0.35% $Al_2O_3$ treatment) | 20 | | |
|   | Zinc stearate | 0.7 | | |
| 3 | Low density polyethylene (density: 0.918 g/cm³, MI: 20 g/10 min.) | 69 | | |
|   | Titanium dioxide (rutile type, surface coating: 0.7% $Al_2O_3$ treatment) | 30 | 20 | 260 |
|   | Zinc stearate | 1 | | |
| 2 | Low density polyethylene (density: 0.918 g/cm³, MI: 7 g/10 min.) | 85 | 7 | 280 |
|   | Alcon P-125 (trade name for alicyclic saturated hydrocarbon resin manufactured by Arakawa Chemical Ind. Co., Ltd.) | 15 | | |

Comparative Example 4

Two waterproof resin layers 4 and 5 of a polyethylene resin were provided on the back side of a paper substrate 1 in the same manner as in Example 3, and then a single waterproof resin layer was provided on the front side of the paper substrate 1, which was the emulsion-coated side. The composition and coating conditions for the waterproof resin layer on the emulsion-coated side of the substrate are shown in the following Table 10. Thus, a support for a photographic printing paper was prepared.

TABLE 10

| Layer No. | Composition of the waterproof resin layer on the emulsion-coated side | Added amount (weight %) | Thickness (μm) | Laminate temperature (°C.) |
|---|---|---|---|---|
| 2 + 3 | Low density polyethylene (density: 0.918 g/cm³, MI: 20 g/10 min.) | 57.5 | | |
| | Titanium dioxide (anatase type, surface coating: 0.4% Al₂O₃ treatment) | 40.0 | 30 | 320 |
| | Ultramarine | 0.5 | | |
| | Zinc stearate | 2.0 | | |

Comparative Example 5

Two waterproof resin layers 4 and 5 of a polyethylene resin were provided on the back side of a paper substrate 1 in the same manner as in Example 3, and then a single waterproof resin layer was provided on the front side of the paper substrate 1, which was the emulsion-coated side. The composition and coating conditions for the waterproof resin layer on the emulsion-coated side are shown in the following Table 11. Thus, a support for a photographic printing paper was prepared.

TABLE 11

| Layer No. | Composition of the waterproof resin layer on the emulsion-coated side | Added amount (weight %) | Thickness (μm) | Laminate temperature (°C.) |
|---|---|---|---|---|
| 2 + 3 | Low density polyethylene (density: 0.918 g/cm³, MI: 20 g/10 min.) | 52.5 | | |
| | Titanium dioxide (anatase type, surface coating: 0.4% Al₂O₃ treatment) | 40.0 | 30 | 260 |
| | Ultramarine | 0.5 | | |
| | High molecular weight β-pinene (terpene series resin) | 5 | | |
| | Zinc stearate | 2.0 | | |

Comparative Example 6

A support for a photographic printing paper was prepared in the same manner as in Comparative Example 4, except that the extruding temperature at which the titanium dioxide-containing waterproof resin layer on the emulsion-coated side was provided was changed to 260° C. The results of Examples 3 to 9 and Comparative Examples 4 to are shown in Table 12.

TABLE 12

| Example No. | Film cracking | Die stripes | Peeling from cooling roll | Adhesion to paper substrate |
|---|---|---|---|---|
| 3 (Inv.) | o | o | o | o |

TABLE 12-continued

| Example No. | Film cracking | Die stripes | Peeling from cooling roll | Adhesion to paper substrate |
|---|---|---|---|---|
| 4 (Inv.) | o | o | o | o |
| 5 (Inv.) | o | o | o | o |
| 6 (Inv.) | o | o | o | o |
| 7 (Inv.) | o | o | o | o |
| 8 (Inv.) | o | o | o | o |
| 9 (Inv.) | o | o | o | o |
| 4 (Comp.) | x | x | o | o |
| 5 (Comp.) | o | o | x | o |
| 6 (Comp.) | o | o | o | x |

In Table 12, o indicates that the result is within an allowable range, and x indicates that the result is outside an allowable range. More specifically they indicate as shown below.

| | | |
|---|---|---|
| Film cracking | o: | during extrusion, film cracking did not generate |
| | x: | during extrusion, film cracking generated |
| Die stripes | o: | die stripes were not formed within 30 minutes after the start of extrusion |
| | x: | die stripes were formed within 30 minutes after the start of extrusion |
| Peeling property | o: | laminating could be conducted at a line speed of 100 m/min or higher |
| | x: | laminating could not be conducted at a line speed of 100 m/min or higher |
| Adhesion to paper substrate | o: | during printer treatment the waterproof resin layer did not peel off from the paper support |
| | x: | during printer treatment, the waterproof resin layer peeled off from the paper support |

Example 10

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 6 and the titanium dioxide-containing waterproof resin layer 3 were provided on the front side of the paper substrate 1, which was the emulsion-coated side. The composition and coating conditions are shown in Table 13. Thus, a support for a photographic printing paper was prepared.

Example 11

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 6 and the titanium dioxide-containing waterproof resin layer 3 were provided on the front side of the paper substrate 1, which was the emulsion-coated side. The composition and coating conditions are shown in Table 14. Thus, a support for a photographic printing paper was prepared.

Example 12

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in the following Table 15. Thus, a support for a photographic printing paper was prepared.

Example 13

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in Table 16. Thus, a support for a photographic printing paper was prepared.

Example 14

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in Table 17. Thus, a support for a photographic printing paper was prepared.

Example 15

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in Table 18. Thus, a support for a photographic printing paper was prepared.

Example 16

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 6 and the titanium dioxide-containing waterproof resin layer 3 were provided on the front side of the paper substrate 1, which was the emulsion-coated side. The composition and coating conditions are shown in Table 19. Thus, a support for a photographic printing paper was prepared.

Example 17

A support having a layer structure shown in FIG. 2 was prepared in the following manner.

The waterproof resin layers 4 and 5 of a polyethylene resin were provided on the back side of the paper substrate 1 in the same manner as in Example 13, and then the waterproof resin layers 2 and 6 and the titanium dioxide-containing waterproof resin layer 3 were provided on the front side of the paper substrate 1, which was the emulsion-coated side. The composition and coating conditions are shown in Table 20. Thus, a support for a photographic printing paper was prepared.

Example 18

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 3 and the titanium dioxide-containing waterproof resin layer 6 were provided on the front side of the paper substrate 1, which was the emulsion-coated side. The composition and coating conditions are shown in Table 21. Thus, a support for a photographic printing paper was prepared.

Example 19

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 3 and the titanium dioxide-containing waterproof resin layer 6 were provided on the front side of the paper substrate 1, which was the emulsion-coated side. The composition and coating conditions are shown in Table 22. Thus, a support for a photographic printing paper was prepared.

Example 20

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 3 and the titanium dioxide-containing waterproof resin layer 6 were provided on the front side of the paper substrate 1, which was the emulsion-coated side. The composition and coating conditions are shown in Table 23. Thus, a support for a photographic printing paper was prepared.

Example 21

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layers 2 and 6 and the titanium dioxide-containing waterproof resin layer 3 were provided on the front side of the paper substrate 1, which was the emulsion-coated side. The composition and coating conditions are shown in Table 24. Thus, a support for a photographic printing paper was prepared.

Example 22

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in Table 25. Thus, a support for a photographic printing paper was prepared.

Example 23

A support having a layer structure shown in FIG. 2 was prepared in the following manner.

The waterproof resin layers 4 and 5 of a polyethylene resin were provided on the back side of the paper substrate 1 in the same manner as in Example 3, and then the waterproof resin layer 2 and the titanium dioxide-containing waterproof resin layers 3 and 6 were provided on the front side of the paper substrate 1, which was the emulsion-coated side. The composition and coating conditions are shown in Table 26. Thus, a support for a photographic printing paper was prepared.

TABLE 13

| Layer No. | Composition | Added amount (weight %) | Thickness (μm) | Laminate temperature (°C.) |
|---|---|---|---|---|
| 6 | Polypropylene (density: 0.910 g/cm$^3$, MI: 21 g/10 min.) | 100 | 2 | 285 |
| 3 | Low density polyethylene (density: 0.918 g/cm$^3$, MI: 20 g/10 min.) | 63.3 | | |
|  | Titanium dioxide (anatase type, surface coating: 0.3% Al$_2$O$_3$ treatment and 0.1% TME treatment) | 35 | 20 | 265 |
|  | Ultramarine | 0.3 | | |
|  | Zinc stearate | 1.4 | | |
| 2 | Low density polyethylene (density: 0.921 g/cm$^3$, MI: 7 g/10 min.) | 74.7 | | |
|  | Alcon P-135 (trade name for alicyclic saturated hydrocarbon resin manufactured by Arakawa Chemical Ind. Co., Ltd.) | 25 | 6 | 295 |
|  | Ultramarine | 0.3 | | |

TME: trimethylolethane

TABLE 14

| Layer No. | Composition | Added amount (weight %) | Thickness (μm) | Laminate temperature (°C.) |
|---|---|---|---|---|
| 6 | Linear low density polyethylene (density: 0.916 g/cm$^3$, MI: 11 g/10 min.) | 100 | 2 | 290 |
| 3 | Low density polyethylene (density: 0.918 g/cm$^3$, MI: 20 g/10 min.) | 78.9 | | |

TABLE 14-continued

| Layer No. | Composition | Added amount (weight %) | Thickness (μm) | Laminate temperature (°C.) |
|---|---|---|---|---|
|  | Titanium dioxide (anatase type, surface coating: 0.3% Al$_2$O$_3$ treatment and 0.1% TME treatment) | 20 | 22 | 270 |
|  | Ultramarine | 0.3 | | |
|  | Zinc stearate | 0.8 | | |
| 2 | Low density polyethylene (density: 0.921 g/cm$^3$, MI: 7 g/10 min.) | 84.7 | | |
|  | Alcon P-115 (trade name for alicyclic saturated hydrocarbon resin manufactured by Arakawa Chemical Ind. Co., Ltd.) | 15 | 4 | 315 |
|  | Ultramarine | 0.3 | | |

TABLE 15

| Layer No. | Composition | Added amount (weight %) | Thickness (μm) | Laminate temperature (°C.) |
|---|---|---|---|---|
| 6 | Polypropylene (density: 0.910 g/cm$^3$, MI: 21 g/10 min.) | 89.6 | 5 | 285 |
|  | Titanium dioxide (anatase type, surface coating: 0.3% Al$_2$O$_3$ treatment and 0.1% TME treatment) | 10 | | |
|  | Zinc stearate | 0.4 | | |
| 3 | Low density polyethylene (density: 0.918 g/cm$^3$, MI: 20 g/10 min.) | 89.3 | | |
|  | Titanium dioxide (anatase type, surface coating: 0.3% Al$_2$O$_3$ treatment and 0.1% TME treatment) | 10 | 18 | 275 |
|  | Ultramarine | 0.3 | | |
|  | Zinc stearate | 0.4 | | |
| 2 | Low density polyethylene (density: 0.921 g/cm$^3$, MI: 7 g/10 min.) | 74.7 | | |
|  | Alcon P-140 (trade name for alicyclic saturated hydrocarbon resin manufactured by Arakawa Chemical Ind. Co., Ltd.) | 25 | 6 | 325 |
|  | Ultramarine | 0.3 | | |

TABLE 16

| Layer No. | Composition | Added amount (weight %) | Thickness (μm) | Laminate temperature (°C.) |
|---|---|---|---|---|
| 6 | Linear low density polyethylene (density: 0.916 g/cm$^3$, MI: 11 g/10 min.) | 84.4 | 5 | 285 |
|  | Titanium dioxide (anatase type, surface coating: 0.3% Al$_2$O$_3$ treatment and 0.1% TME treatment) | 15 | | |

TABLE 16-continued

| Layer No. | Composition | Added amount (weight %) | Thickness (μm) | Laminate temperature (°C.) |
|---|---|---|---|---|
| | Zinc stearate | 0.6 | | |
| 3 | Low density polyethylene (density: 0.918 g/cm³, MI: 20 g/10 min.) | 84.1 | | |
| | Titanium dioxide (anatase type, surface coating: 0.3% Al$_2$O$_3$ treatment and 0.1% TME treatment) | 15 | 17 | 280 |
| | Ultramarine | 0.3 | | |
| | Zinc stearate | 0.6 | | |
| 2 | Low density polyethylene (density: 0.921 g/cm³, MI: 7 g/10 min.) | 74.7 | | |
| | FTR 8120 (trade name for aromatic petroleum resin manufactured by Mitsui Petrochemical Ind. Co.) | 25 | 6 | 300 |
| | Ultramarine | 0.3 | | |

TABLE 17

| Layer No. | Composition | Added amount (weight %) | Thickness (μm) | Laminate temperature (°C.) |
|---|---|---|---|---|
| 6 | Polypropylene (density: 0.910 g/cm³, MI: 21 g/10 min.) | 89.6 | 5 | 285 |
| | Titanium dioxide (anatase type, surface coating: 0.3% Al$_2$O$_3$ treatment and 0.1% TME treatment) | 10 | | |
| | Zinc stearate | 0.4 | | |
| 3 | Polypropylene (density: 0.910 g/cm³, MI: 21 g/10 min.) | 89.3 | | |
| | Titanium dioxide (anatase type, surface coating: 0.3% Al$_2$O$_3$ treatment and 0.1% TME treatment) | 10 | 18 | 265 |
| | Ultramarine | 0.3 | | |
| | Zinc stearate | 0.4 | | |
| 2 | Low density polyethylene (density: 0.921 g/cm³, MI: 7 g/10 min.) | 74.7 | | |
| | Bondine TX-8030 (trade name for adhesive polyolefin resin* manufactured by Sumitomo Chemical Ind. Co., Ltd.) | 25 | 6 | 310 |
| | Ultramarine | 0.3 | | |

*ethylene-ethylacrylate-maleic acid anhydride copolymer

TABLE 18

| Layer No. | Composition | Added amount (weight %) | Thickness (μm) | Laminate temperature (°C.) |
|---|---|---|---|---|
| 6 | Linear low density polyethylene (density: 0.916 g/cm³, MI: 11 g/10 min.) | 84.4 | 5 | 285 |

TABLE 18-continued

| Layer No. | Composition | Added amount (weight %) | Thickness (μm) | Laminate temperature (°C.) |
|---|---|---|---|---|
| | Titanium dioxide (anatase type, surface coating: 0.3% Al$_2$O$_3$ treatment and 0.1% TME treatment) | 15 | | |
| | Zinc stearate | 0.6 | | |
| 3 | Linear low density polyethylene (density: 0.916 g/cm³, MI: 11 g/10 min.) | 84.1 | | |
| | Titanium dioxide (anatase type, surface coating: 0.3% Al$_2$O$_3$ treatment and 0.1% TME treatment) | 15 | 17 | 280 |
| | Ultramarine | 0.3 | | |
| | Zinc stearate | 0.6 | | |
| 2 | Low density polyethylene (density: 0.921 g/cm³, MI: 7 g/10 min.) | 74.7 | | |
| | FTR 8120 (trade name for aromatic petroleum resin manufactured by Mitsui Petrochemical Ind. Co.) | 25 | 6 | 290 |
| | Ultramarine | 0.3 | | |

TABLE 19

| Layer No. | Composition | Added amount (weight %) | Thickness (μm) | Laminate temperature (°C.) |
|---|---|---|---|---|
| 6 | Polypropylene (density: 0.910 g/cm³, MI: 21 g/10 min.) | 100 | 2 | 285 |
| 3 | Polypropylene (density: 0.910 g/cm³, MI: 21 g/10 min.) | 84.1 | | |
| | Titanium dioxide (anatase type, surface coating: 0.3% Al$_2$O$_3$ treatment and 0.1% TME treatment) | 15 | 20 | 275 |
| | Ultramarine | 0.3 | | |
| | Zinc stearate | 0.6 | | |
| 2 | Low density polyethylene (density: 0.921 g/cm³, MI: 7 g/10 min.) | 74.7 | | |
| | Alcon P-140 (trade name for alicyclic saturated hydrocarbon resin manufactured by Arakawa Chemical Ind. Co., Ltd.) | 25 | 6 | 285 |
| | Ultramarine | 0.3 | | |

TABLE 20

| Layer No. | Composition | Added amount (weight %) | Thickness (μm) | Laminate temperature (°C.) |
|---|---|---|---|---|
| 6 | Linear low density polyethylene (density: 0.916 g/cm³, MI: 11 g/ | 100 | 2 | 290 |

TABLE 20-continued

| Layer No. | Composition | Added amount (weight %) | Thickness (μm) | Laminate temperature (°C.) |
|---|---|---|---|---|
| | 10 min.) | | | |
| 3 | Linear low density polyethylene (density: 0.916 g/cm$^3$, MI: 11 g/10 min.) | 73.7 | | |
| | Titanium dioxide (anatase type, surface coating: 0.3% Al$_2$O$_3$ treatment and 0.1% TME treatment) | 25 | 22 | 260 |
| | Ultramarine | 0.3 | | |
| | Zinc stearate | 1.0 | | |
| 2 | Low density polyethylene (density: 0.921 g/cm$^3$, MI: 7 g/10 min.) | 74.7 | | |
| | Acryft WH 302 (trade name for EMMA resin manufactured by Sumitomo Chemical Ind. Co., Ltd.) | 25 | 4 | 315 |
| | Ultramarine | 0.3 | | |

TABLE 21

| Layer No. | Composition | Added amount (weight %) | Thickness (μm) | Laminate temperature (°C.) |
|---|---|---|---|---|
| 6 | Linear low density polyethylene (density: 0.916 g/cm$^3$, MI: 11 g/10 min.) | 78.9 | 18 | 285 |
| | Titanium dioxide (anatase type, surface coating: 0.3% Al$_2$O$_3$ treatment and 0.1% TME treatment) | 20 | | |
| | Zinc stearate | 0.8 | | |
| | Ultramarine | 0.3 | | |
| 3 | Linear low density polyethylene (density: 0.916 g/cm$^3$, MI: 11 g/10 min.) | 99.7 | | |
| | Ultramarine | 0.3 | 4 | 285 |
| 2 | Low density polyethylene (density: 0.921 g/cm$^3$, MI: 7 g/10 min.) | 74.7 | | |
| | Admer VF-500 (trade name for adhesive polyolefin resin* manufactured by Mitsui Petrochemical Ind. Co., Ltd.) | 25 | 6 | 290 |
| | Ultramarine | 0.3 | | |

*graft polymerized polyethylene (or polypropylene) with maleic anhydride

TABLE 22

| Layer No. | Composition | Added amount (weight %) | Thickness (μm) | Laminate temperature (°C.) |
|---|---|---|---|---|
| 6 | Polypropylene (density: 0.910 g/cm$^3$, MI: 21 g/10 min.) | 84.1 | 18 | 285 |

TABLE 22-continued

| Layer No. | Composition | Added amount (weight %) | Thickness (μm) | Laminate temperature (°C.) |
|---|---|---|---|---|
| | Titanium dioxide (anatase type, surface coating: 0.3% Al$_2$O$_3$ treatment and 0.1% TME treatment) | 15 | | |
| | Zinc stearate | 0.6 | | |
| | Ultramarine | 0.3 | | |
| 3 | Polypropylene (density: 0.910 g/cm$^3$, MI: 21 g/10 min.) | 99.7 | | |
| | Ultramarine | 0.3 | 4 | 285 |
| 2 | Low density polyethylene (density: 0.921 g/cm$^3$, MI: 7 g/10 min.) | 75 | | |
| | Bondine TX-8030 (trade name for adhesive polyolefin resin* manufactured by Sumitomo Chemical Ind. Co., Ltd.) | 25 | 6 | 290 |

*ethylacrylate-maleic acid anhydride copolymer

TABLE 23

| Layer No. | Composition | Added amount (weight %) | Thickness (μm) | Laminate temperature (°C.) |
|---|---|---|---|---|
| 6 | Low density polyethylene (density: 0.923 g/cm$^3$, MI: 4.3 g/10 min.) | 81.1 | | |
| | Titanium dioxide (anatase type, surface coating: 0.7% Al$_2$O$_3$ treatment) | 18 | 18 | 290 |
| | Ultramarine | 0.3 | | |
| | Zinc stearate | 0.6 | | |
| 3 | Linear low density polyethylene (density: 0.916 g/cm$^3$, MI: 11 g/10 min.) | 70 | | |
| | Ultramarine | 0.3 | 6 | 290 |
| | Low density polyethylene (density: 0.923 g/cm$^3$, MI: 4.3 g/10 min.) | 29.7 | | |
| 2 | Low density polyethylene (density: 0.923 g/cm$^3$, MI: 4.3 g/10 min.) | 69.7 | | |
| | Ultramarine | 0.3 | 4 | 290 |
| | Alcon P-140 (trade name for alicyclic saturated hydrocarbon resin manufactured by Arakawa Chemical Ind. Co., Ltd.) | 30 | | |

TABLE 24

| Layer No. | Composition | Added amount (weight %) | Thickness (μm) | Laminate temperature (°C.) |
|---|---|---|---|---|
| 6 | Polypropylene (density: 0.910 g/cm$^3$, MI: 21 g/10 min.) | 100 | 2 | 285 |
| 3 | Linear low density | 73.7 | | |

TABLE 24-continued

| Layer No. | Composition | Added amount (weight %) | Thickness (μm) | Laminate temperature (°C.) |
|---|---|---|---|---|
|  | polyethylene (density: 0.916 g/cm³, MI: 11 g/10 min.) |  |  |  |
|  | Titanium dioxide (anatase type, surface coating: 0.3% Al₂O₃ treatment and 0.1% TME treatment) | 25 | 20 | 280 |
|  | Ultramarine | 0.3 |  |  |
|  | Zinc stearate | 1.0 |  |  |
| 2 | Low density polyethylene (density: 0.921 g/cm³, MI: 7 g/10 min.) | 70 |  |  |
|  | Adtex ET-182G (trade name for copolymer derived from ethylene manufactured by Showa Denko Co., Ltd.) | 30 | 6 | 290 |

TABLE 25

| Layer No. | Composition | Added amount (weight %) | Thickness (μm) | Laminate temperature (°C.) |
|---|---|---|---|---|
| 6 | Polypropylene (density: 0.910 g/cm³, MI: 21 g/10 min.) | 89.6 | 3 | 285 |
|  | Titanium dioxide (anatase type, surface coating: 0.3% Al₂O₃ treatment and 0.1% TME treatment) | 10 |  |  |
|  | Zinc stearate | 0.4 |  |  |
| 3 | Linear low density polyethylene (density: 0.916 g/cm³, MI: 11 g/10 min.) | 78.9 |  |  |
|  | Titanium dioxide (anatase type, surface coating: 0.3% Al₂O₃ treatment and 0.1% TME treatment) | 20 | 20 | 265 |
|  | Ultramarine | 0.3 |  |  |
|  | Zinc stearate | 0.8 |  |  |
| 2 | Low density polyethylene (density: 0.921 g/cm³, MI: 7 g/10 min.) | 75 |  |  |
|  | Acrift WH 302 (trade name for EMMA resin manufactured by Sumitomo Chemical Ind. Co., Ltd.) | 25 | 5 | 290 |

TABLE 26

| Layer No. | Composition | Added amount (weight %) | Thickness (μm) | Laminate temperature (°C.) |
|---|---|---|---|---|
| 6 | Linear low density polyethylene (density: 0.916 g/cm³, MI: 11 g/10 min.) | 79.2 | 3 | 285 |
|  | Titanium dioxide (anatase type, surface coating: 0.3% Al₂O₃ treatment and 0.1% TME treatment) | 20 |  |  |
|  | Zinc stearate | 0.8 |  |  |
| 3 | Polypropylene (density: 0.910 g/cm³, MI: 21 g/10 min.) | 84.1 |  |  |
|  | Titanium dioxide (anatase type, surface coating: 0.3% Al₂O₃ treatment and 0.1% TME treatment) | 15 | 20 | 265 |
|  | Ultramarine | 0.3 |  |  |
|  | Zinc stearate | 0.6 |  |  |
| 2 | Low density polyethylene (density: 0.921 g/cm³, MI: 7 g/10 min.) | 90 |  |  |
|  | Talc | 10 | 5 | 320 |

Example 24

At a first laminate station, polyethylene having a density of 0.925 g/m³ and MI of 8 g/10 minutes was coated on one side of a base paper having a weight of 170° g/m² at a speed of 200 m/minute to form a polyethylene layer having a film thickness of 28 μm.

Subsequently, at a second station, a polyethylene having a density of 0.925 g/cm³ and MI of 20 g/10 minutes and containing 40 wt % of $TiO_2$ and 1.5 wt % of zinc stearate as a dispersant for $TiO_2$ as an upper layer in a film thickness of 15 m at an extruding temperature of 250° C. and polyethylene having a density of 0.945 g/m³ and MI of 2 g/10 minutes containing 10 wt % of talc as a lower layer in a film thickness of 15 μm at an extruding temperature of 320° C. were laminated on the other side of the base paper. The total thickness of the upper and lower layers was 30 μm, and the layers were laminated by a multi-layer extrusion at a speed of 200 m/minute. Thus, a support for a photographic printing paper having no film cracking generated and having an adhesion to the base paper of 30–400 g/15 mm width (a peel strength measured at a speed of 50 mm/minute and 180° C. with a load cell of 50 kg using a tensilon) was obtained. This support had a peel strength of the same level as that obtained by a conventional single layer-extrusion laminate method at 320° C. Die lip stripe formation was not observed even after an operation for 8 hours.

Comparative Example 7

At the second station in Example 24, polyethylene having a density of 0.925 g/m² and MI of 2 g/10 minutes and containing 40 wt of $TiO_2$ and 1.5 wt % of zinc stearate as a dispersant for $TiO_2$ and in a film thickness of 30 μm at an extruding temperature of 320° C. was laminated in a single layer. Film cracking and die lip stripes were generated on the thus obtained support and an even polyethylene coating layer could not be formed.

Comparative Example 8

At the second station in Example 24, a composition the same as that of the upper polyethylene layer in Example 24 was used to form a single layer laminate at an extrusion temperature of 250° C. and a speed of 200 m/minute on the base paper in a film thickness of 30 µm. The laminate processing could not be continued due to film peeling between the base paper and the polyethylene layer.

Comparative Example 9

At the second station in Example 24, polyethylene having a MI of 2 g/10 minutes was laminated instead of polyethylene as the upper layer in Example 24 to a film thickness of 15 µm at a extruding temperature of 320° C., with the lower layer being the same as that in Example 24 with the same conditions. The total thickness of the upper and lower layers was 30 µm, and the layers were laminated by a multi-layer extrusion at a speed of 200 m/minute. Film cracking was generated on the upper layer of the thus obtained support, and an even polyethylene coating layer could not be formed.

Example 25

In the same manner as Example 24, at the first laminate station, polyethylene having a density of 0.945 g/m³ and MI of 8 g/10 minutes was coated on a base paper having a weight of 170° g/m² to a film thickness of 28 µm at a speed of 200 m/minute to form a polyethylene layer on one side of the base paper.

Subsequently, at the second station, polyethylene having a density of 0.925 g/m³ and MI of 20 g/10 minutes was used for an upper layer, and polyethylene having a density of 0.925 g/m³ and MI of 2 g/10 minutes was used for the lower layer. $TiO_2$ was added into the polyethylene in a proportion shown in the following Table 27, and zinc stearate was incorporated in a proportion of 5.0 wt % based on the $TiO_2$ amount, and into the polyethylene used for the lower layer 10 wt % of talc was incorporated, followed by kneading in a Bumbury's mixer and molding to a pellet form, whereby a master batch was prepared. $TiO_2$ having an average particle size of 0.15 µm to 0.35 µm as observed with an electron microscope and having a coating of aluminum oxide hydrate in an amount of 0.35 wt % based on $TiO_2$ in terms of $Al_2O_3$ was used.

On the other side of the base paper coated at the first station, the upper layer was formed at an extruding temperature of 250° C., and the lower layer was formed at an extruding temperature of 320° C. in a film thickness as shown in Table 27. A two-layer polyethylene coating was obtained at a speed of 200 m/minute.

Next, this polyethylene layer surface was subjected to a glow discharge treatment, and then a silver chloride emulsion was coated to thereby obtain a photographic printing paper. The photographic printing paper was tightly contacted on a resolving power chart and exposed to a green light, followed by subjecting it to a color image processing, whereby a test sheet was obtained. This test sheet was measured with a microdensitometer and a calculation was carried out with a personal computer according to a conventional method to obtain the CTF (Contrast Transfer Function: a value at 10 lines/mm) as the sharpness of an image in a magenta layer to judge the sharpness of a printed image on a photographic resin-coated paper. In regard to the CTF, the larger the value thereof, the higher the sharpness of a printed image.

The results are shown in Table 27. As is apparent from Table 27, it can be found that the support for a photographic printing paper of the present invention is able to provide a high sharpness of a printed image.

TABLE 27

| Sample No. | $TiO_2$ concentration (wt %)/ layer thickness (µm) | | Sharpness of printed image |
|---|---|---|---|
| | Upper layer | Lower layer | CTF value |
| 1 | 15/15 | 15/15 | 0.62 |
| 2 | 50/15 | 0/15 | 0.82 |
| 3 | 40/15 | 0/15 | 0.80 |
| 4 | 40/15 | 15/15 | 0.81 |
| 5 | 30/15 | 0/15 | 0.77 |
| 6 | 25/15 | 0/15 | 0.73 |

Example 26

In the same manner as Example 24, a polyethylene layer having a film thickness of 28 µm was coated on a one side of the base paper at the first laminate station, and then at the second station, polyethylene having MI of 20 g/10 minutes and containing 15 wt % of $TiO_2$ as the upper layer to a film thickness of 15 µm at the extruding temperature of 320° C., and polyethylene having MI of 2 g/10 minutes and containing talc (the content of which was changed in a range of from 0 to 30 wt %) for the lower layer to a film thickness of 15 µm at an extruding temperature of 320° C. were coated on the other side of the base paper to provide a two-layer polyethylene coating layer at a speed of 200 m/minute.

Further, a support was prepared in the same manner as above except that a base paper subjected to a corona discharge treatment before coating was used.

Figure 3:
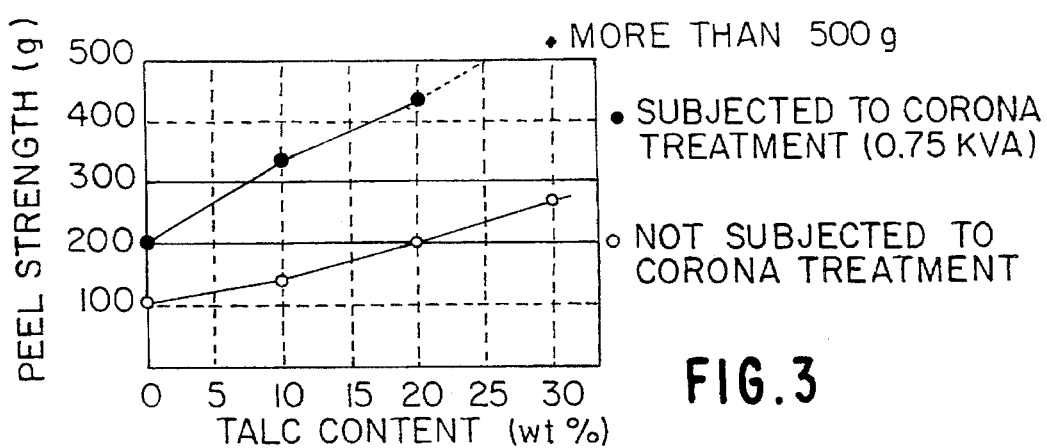
FIG. 3 shows a graph of adhesion strength with respect to the content of talc.

In order to measure the adhesion between this two-layer polyethylene-coating layer and the base paper, a tensilon was used to measure the peel strength of a sample having a width of 15 µm at a load cell of 5 kg, a speed of 50 m/minute and a peel angle of 180° C. The results are shown in FIG. 3. As apparent from FIG. 3, it can be found that the addition of talc improves the adhesion between the polyethylene-coating layer and the base paper.

While the invention has been described in detail and with reference to specific embodiments thereof, it will be apparent to one skilled in the art that various changes and modifications can be made therein without departing from the spirit and scope thereof.

What is claimed is:

1. A support for a photographic printing paper comprising a substrate and waterproof resin coating layers provided on both sides of the substrate, wherein at least the waterproof resin coating provided on the side of the substrate on which an emulsion for forming an image is to be coated comprises i) a lowermost melt-extruded waterproof resin coating layer contacting the substrate and ii) at least one melt-extruded upper coating layer containing a waterproof resin capable of being melt-extruded at a temperature of from 170° to 290° C. and containing uniformly dispersed titanium dioxide wherein the lowermost melt-extruded waterproof resin coating layer contains at least one additive selected from the group consisting of a tackifier, an adhesive resin, talc, kaolin and calcium carbonate.

2. The support for a photographic printing paper as in claim 1, wherein the amount of the titanium dioxide in the at least one upper coating layer is from 5 to 60 weight % based on the weight of the composition of the waterproof resin layer.

3. The support for a photographic printing paper as in claim 1, wherein the waterproof resin contained in said at least one titanium dioxide-containing waterproof resin layer has a melt index falling within a range of from 1.2 to 100 g/10 minutes.

4. The support for a photographic printing paper as in claim 1, wherein said waterproof resin in a layer which does not contain titanium dioxide has a melt index falling within a range of from 1.2 to 100 g/10 minutes.

5. The support for a photographic printing paper as in claim 1, wherein said waterproof resin is a polyolefin resin.

6. The support for a photographic printing paper as in claim 5, wherein said polyolefin resin is at least one resin selected from the group consisting of low density polyethylene, linear low density polyethylene, high density polyethylene, polypropylene, and an ester copolymer.

7. The support for a photographic printing paper as in claim 1, wherein the at least one upper waterproof resin coating layer containing titanium dioxide is formed by melt-extrusion at a resin temperature of from 170° to 290° C.

8. The support for a photographic printing paper as in claim 1, wherein the amount of said tackifier in the lowermost waterproof resin layer is from 0.5 to 60 weight % based on the weight of the composition of the layer.

9. The support for a photographic printing paper as in claim 1, wherein the amount of said adhesive resin in the lowermost waterproof resin layer is from 5 to 500 weight % based on the weight of the composition of the layer.

10. The support for a photographic printing paper as in claim 1, wherein said tackifier is at least one resin selected from the group consisting of a rosin compound resin, a terpene resin, a coumarone-indene resin and a petroleum hydrocarbon resin.

11. The support for a photographic printing paper as in claim 1, wherein said adhesive resin is selected from the group consisting of an adhesive polyolefin resin and an ethylene copolymer resin.

12. The support for a photographic printing paper as in claim 12, wherein said ethylene copolymer resin is selected from the group consisting of an ionomer, an ethylene-vinyl acetate copolymer, an ethylene-methyl methacrylate copolymer, an ethylene-ethyl acrylate copolymer, an ethylene-methyl acrylate copolymer, an ethylene-acrylic acid copolymer, an ethylene-ethyl acrylate-maleic anhydride copolymer, an ethylene-methacrylic acid copolymer, and a graft-polymer of polyolefin with maleic anhydride and the metal salts thereof.

13. The support for a photographic printing paper as in claim 1, wherein said adhesive resin is at least one resin of an adhesive polyolefin resin, an ethylene-vinyl acetate copolymer, an ethylene-acrylic acid copolymer and metal salt thereof, and an ethylene-methyl methacrylate copolymer.

14. The support for a photographic printing paper as in claim 1, wherein the amount of at least one of talc, kaolin and calcium carbonate is from 0.1 to 30 weight % based on the weight of the layer composition containing at least one of these compounds.

15. The support for a photographic printing paper as in claim 1, wherein the average particle size of the talc, kaolin and calcium carbonate is from 0.01 to 1.0 µm.

16. The support for a photographic printing paper as in claim 1, wherein said coating, provided on the side of the substrate on which an emulsion for forming an image is coated consists of the lowermost waterproof layer and an upper waterproof resin layer, wherein the lowermost layer has a thickness of from 0.5 to 20 µm and the upper waterproof resin coating layer has a thickness of from 0.5 to 50 µm.

17. The support for a photographic printing paper as in claim 1, wherein said coating provided on the side of the substrate on which an emulsion for forming an image is coated consists of a lowermost waterproof layer, an intermediate waterproof layer and an upper most waterproof layer, wherein the lowermost waterproof layer has a thickness of from 0.5 to 10 µm and the uppermost waterproof layer and the intermediate waterproof layer each has a thickness of from 0.5 to 50 µm.

18. The support for a photographic printing paper as in claim 1, wherein said coating provided on the side of the substrate on which an emulsion for forming an image is coated consists of a lowermost waterproof layer, an intermediate waterproof layer and an upper most waterproof layer, wherein the intermediate waterproof layer comprises a waterproof resin and titanium dioxide and the uppermost layer comprises a waterproof resin and contains no titanium dioxide.

19. The support for a photographic printing paper as in claim 1, wherein said lowermost waterproof resin coating layer contains titanium dioxide in an amount of less than 20 weight % based on the weight of the composition of the waterproof resin layer.

20. The support for a photographic printing paper as in claim 1, wherein said emulsion is a light-sensitive silver halide emulsion.

21. A method for manufacturing a support for a photographic material, which comprises forming a lowermost coating layer containing a waterproof resin and at least one upper coating layer containing a waterproof resin and titanium dioxide dispersed therein, by melt-extrusion coating on the side of a substrate to which an emulsion is to be coated, wherein the temperature of the extrusion of the upper layer containing titanium dioxide is from 170° to 290° C. and the temperature of the extrusion of the lowermost layer is from 290° C. to 345° C.

22. The method for manufacturing a support for a photographic printing paper as in claim 21, wherein the waterproof resin in the layer containing titanium dioxide has a melt index of from 1.2 to 100 g/10 minutes.

23. The support for a photographic printing paper as in claim 21, wherein the amount of the titanium dioxide in the at least one upper coating layer is from 5 to 60 weight % based on the weight of the composition of the waterproof resin layer.

24. The support for a photographic printing paper as in claim 21, wherein tackifier is present in the lowermost waterproof resin layer in an amount of from 0.5 to 60 weight % based on the weight of the composition of the layer.

25. The support for a photographic printing paper as in claim 22, wherein adhesive resin is present in the lowermost waterproof resin layer in an amount of from 5 to 500 weight % based on the weight of the composition of the layer.

* * * * *